(12) United States Patent
Baronne et al.

(10) Patent No.: US 12,282,800 B2
(45) Date of Patent: Apr. 22, 2025

(54) THREAD REPLAY TO PRESERVE STATE IN A BARREL PROCESSOR

(71) Applicant: Micron Technology, Inc., Boise, ID (US)

(72) Inventors: Chris Baronne, Allen, TX (US); Dean E. Walker, Allen, TX (US); John Amelio, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 928 days.

(21) Appl. No.: 17/075,013

(22) Filed: Oct. 20, 2020

(65) Prior Publication Data

US 2022/0121485 A1   Apr. 21, 2022

(51) Int. Cl.
| | |
|---|---|
| *G06F 9/48* | (2006.01) |
| *G06F 1/10* | (2006.01) |
| *G06F 9/46* | (2006.01) |
| *G06F 9/50* | (2006.01) |
| *G06F 12/0875* | (2016.01) |

(52) U.S. Cl.
CPC .............. *G06F 9/4881* (2013.01); *G06F 1/10* (2013.01); *G06F 9/46* (2013.01); *G06F 9/466* (2013.01); *G06F 9/48* (2013.01); *G06F 9/4843* (2013.01); *G06F 9/485* (2013.01); *G06F 9/50* (2013.01); *G06F 12/0875* (2013.01); *G06F 2212/452* (2013.01)

(58) Field of Classification Search
CPC ... G06F 9/46; G06F 9/466; G06F 9/48; G06F 9/4806; G06F 9/4843; G06F 9/485; G06F 9/4881; G06F 9/50; G06F 9/505
See application file for complete search history.

(56) References Cited

U.S. PATENT DOCUMENTS

| 9,317,297 B2* | 4/2016 | Gottschlich ........... G06F 9/3005 |
| 2006/0123423 A1* | 6/2006 | Brenner ................ G06F 9/5083 |
| | | 718/105 |
| 2011/0119528 A1* | 5/2011 | Karlsson ............. G06F 11/1405 |
| | | 714/25 |
| 2011/0302585 A1* | 12/2011 | Dice ...................... G06F 9/5033 |
| | | 718/102 |
| 2013/0160023 A1* | 6/2013 | Suzuki .................. G06F 9/5027 |
| | | 718/104 |
| 2014/0181833 A1* | 6/2014 | Bird ...................... G06F 9/5077 |
| | | 718/105 |

(Continued)

*Primary Examiner* — Charles M Swift

(74) *Attorney, Agent, or Firm* — Schwegman Lundberg & Woessner, P.A.

(57) ABSTRACT

Devices and techniques for thread replay to preserve state in a barrel processor are described herein. An apparatus includes a barrel processor, which includes a temporary memory; and a thread scheduling circuitry; wherein the barrel processor is configured to perform operations through use of the thread scheduling circuitry, the operations including those to: schedule a current thread to place into a pipeline for the barrel processor on a clock cycle, the barrel processor to schedule threads on each clock cycle; store the current thread in the temporary memory; detect that no thread is available on a clock cycle subsequent to the cycle that the current thread is scheduled; and in response to detecting that no thread is available on the subsequent clock cycle, repeat scheduling the current thread based on the contents of the temporary memory.

25 Claims, 6 Drawing Sheets

(56) References Cited

U.S. PATENT DOCUMENTS

2015/0302219 A1* 10/2015 Lahteenmaki ........ H04L 63/105
                                                      726/29
2022/0066831 A1*  3/2022 Gates .................... G06F 9/5027

* cited by examiner

THREAD REPLAY TO PRESERVE STATE IN A BARREL PROCESSOR

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits (ICs), or "chips", potentially in combination with discrete circuit components, and commonly coupled to a respective substrate to facilitate attachment to the interposer. Most or all chiplets in a system may be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
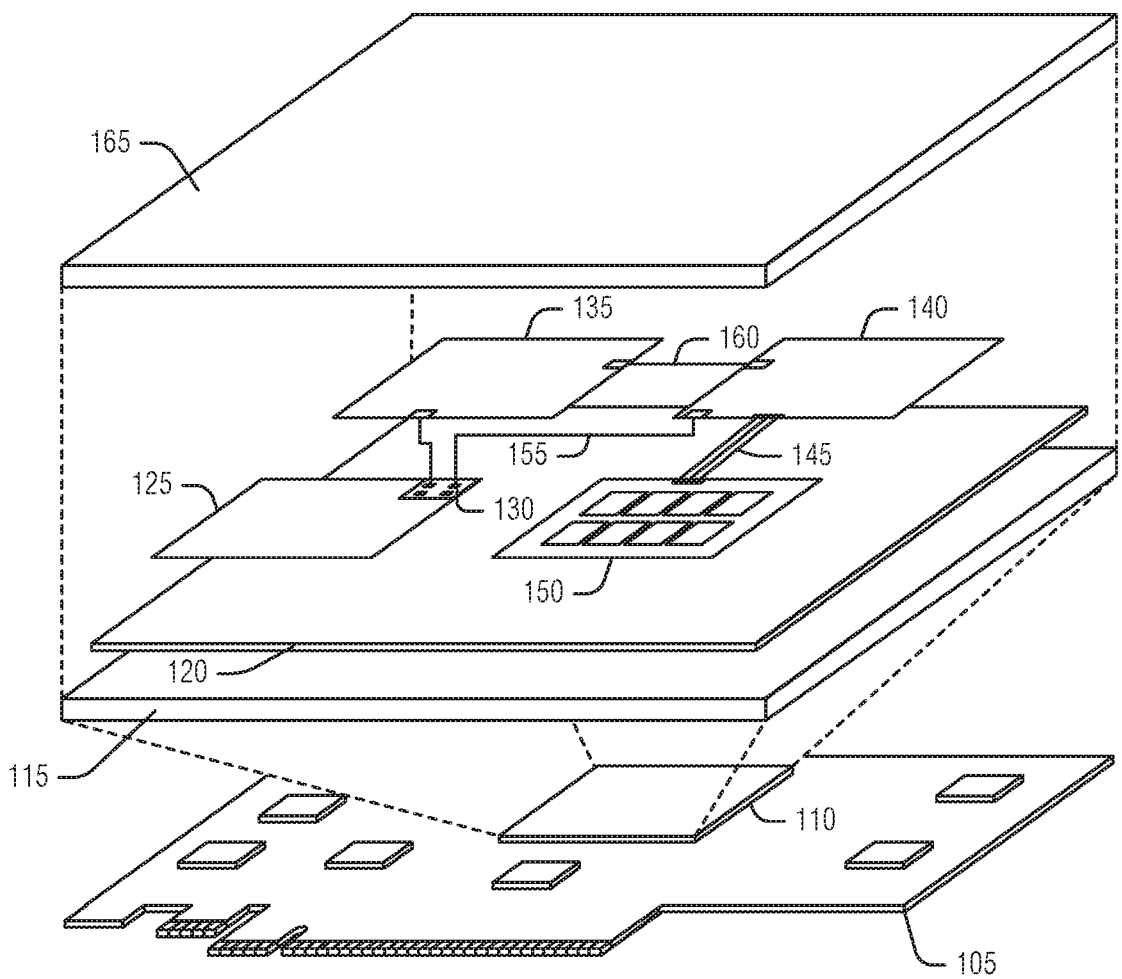
FIGS. 1A and 1B illustrate an example of a chiplet system, according to an embodiment.
Figure 1B:
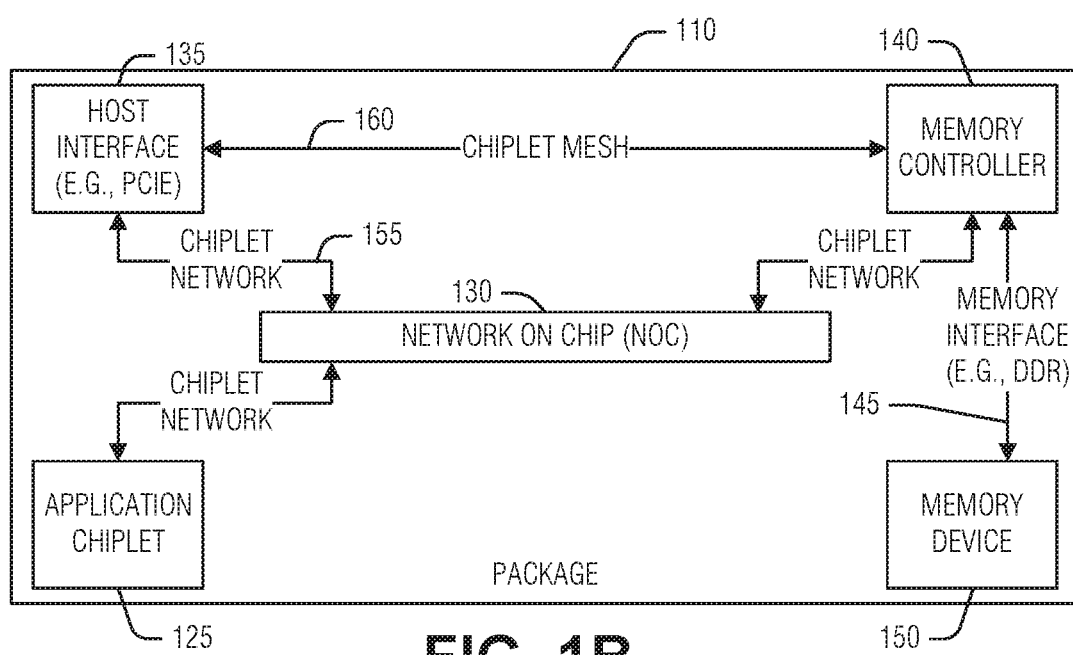

FIGS. 1A-1B, described below, offers an example of a chiplet system and the components operating therein. The illustrated chiplet system includes a memory controller. This memory controller includes a programmable atomic unit (PAU) to execute a custom program, a programmable atomic operation, in response to a memory request for the programmable atomic operation. Additional details about the PAU are described below with respect to FIGS. 2 and 3. The processor of the PAU can be barrel-multithreaded and pipelined.

Power management within a barrel-multithreaded processor can be an increasingly difficult task to manage while balancing performance and throughput. In a multi-threaded processing system, when there are no threads ready for execution, the processor may advance to a low power state. Cycling between a low power state and a ready state can cause latency while threads wait for the processor to achieve the ready state. Alternative techniques, such as clock gating certain logic blocks or otherwise powering down aspects of the compute pipeline that are not required for a given thread, increase circuit complexity. Moreover, these techniques come with their own power costs while processor logic is toggled between idle and active states.

The present disclosure discusses a control mechanism to replay or repeat the scheduling of a current thread when there are no threads available for pipeline processing. By holding scheduler outputs, logic in the compute pipeline is held in a steady state. Power consumption due to toggling logic states from idle to active are removed. As a result, the improved control mechanism reduces overall power draw.

The present control mechanism provides distinct advantages including reduced circuit complexity over other proposed systems that address this issue, overall reduction in power draw, and minimal additional circuitry to implement.

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe) interface, for example. The chiplet system 110 includes a package substrate 15, an interposer 120, and four chiplets: an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB control or subordinate (i.e., "master" or "slave") depending on which chiplet provides the master clock. AIB I/O cells support three clocking modes: asynchronous (i.e., non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across connected chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM, synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
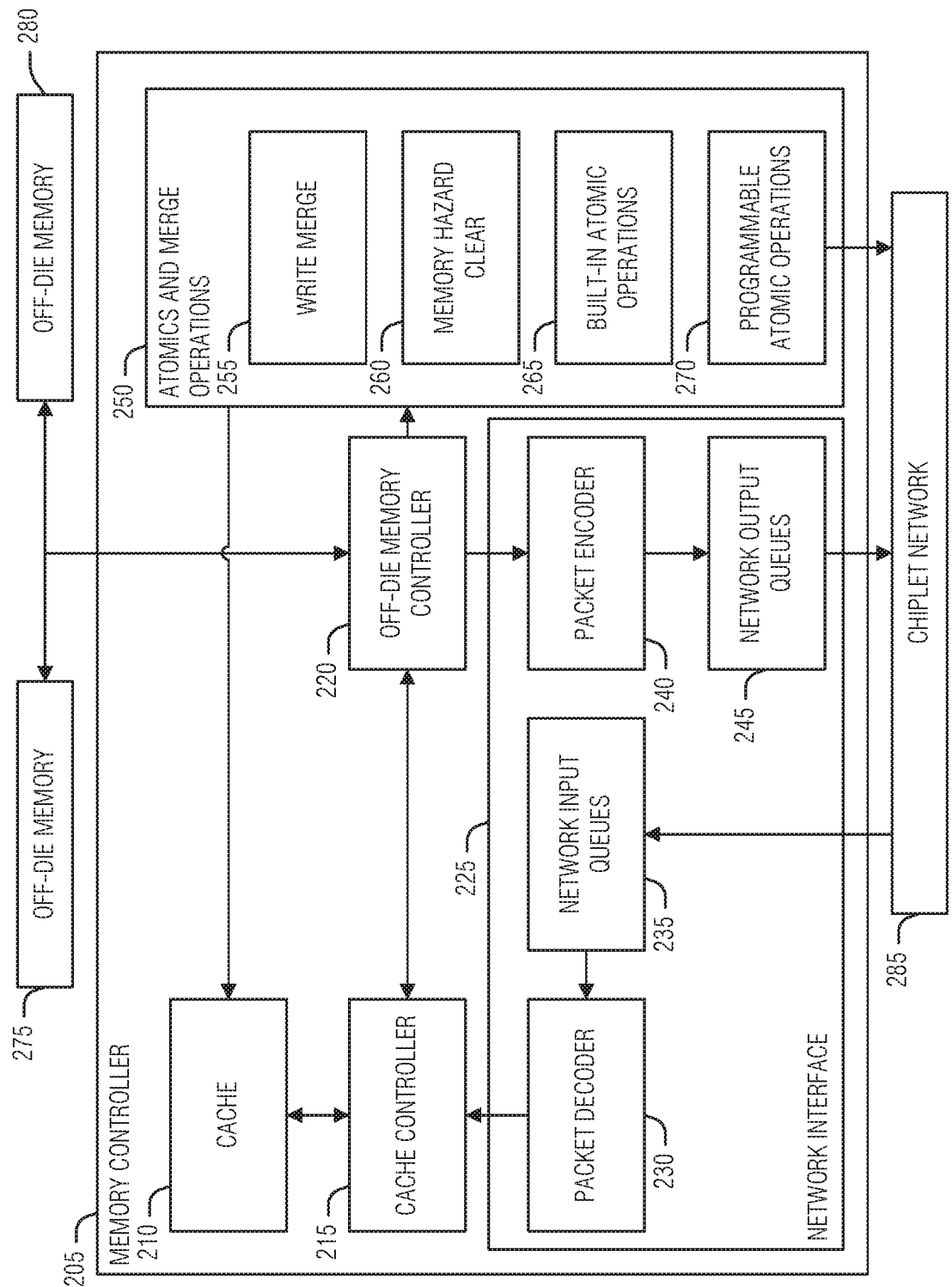
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory devices, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the packet encoder 240 to encode outgoing data packets for transmission on the chiplet network 285, the built-in atomic operation unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operations (also referred to as "custom atomic transactions" or "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the built-in atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operations is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
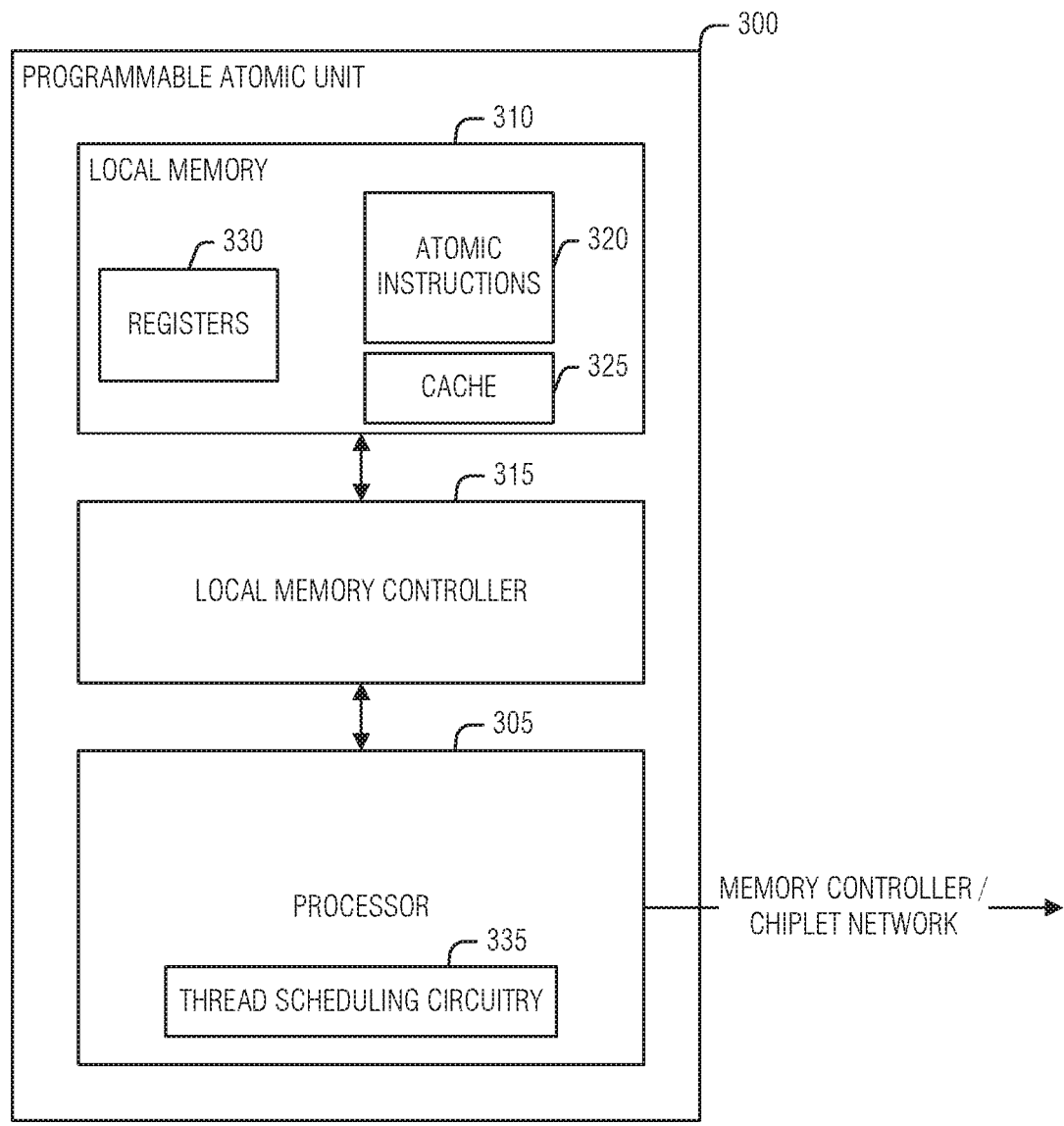
FIG. 3 illustrates components in an example of a programmable atomic unit (PAU), according to an embodiment.

FIG. 3 illustrates components in an example of a programmable atomic unit (PAU) 300, such as those noted above with respect to FIG. 1 (e.g., in the memory controller 140) and FIG. 2 (e.g., PAU 270), according to an embodiment. As illustrated, the PAU 300 includes a processor 305, local memory 310 (e.g., SRAM), and a controller 315 for the local memory 310.

In an example, the processor 305 is a barrel processor, with circuitry to switch between different register files (e.g., sets of registers containing current processing state) upon each clock cycle of the processor 305. Although processor 305 is discussed herein in an example implementation in PAU 300 of a memory controller chiplet 205, the configuration and operation of processor 305 may also be used in other functions of memory controller chiplet 205 (for example, to perform built-in atomic operations), or may be used in a variety of other contexts, including but not limited to, in other chiplets of a chiplet system 110. This configuration of a barrel processor enables efficient context switching between currently executing threads. In an example, the processor 305 supports eight threads, resulting in eight register files. In an example, some or all of the register files 330 are not integrated into the processor 305, but rather reside in the local memory 310. This reduces circuit complexity in the processor 305 by eliminating the traditional flip-flops used for these registers.

The local memory 310 can also house a cache and instructions for atomic operations 320. The atomic instructions 320 comprise sets of instructions to support the various application-loaded atomic operations. When an atomic operation is requested, e.g., by the application chiplet 125, a set of instructions corresponding to the atomic operation are executed by the processor 305. In an example, the instructions 320 reside in partitions of the local memory 310. In this example, the specific programmable atomic operation being requested by a requesting process can identify the programmable atomic operation by the partition number. The partition number can be established when the programmable atomic operation is registered with (e.g., loaded onto) the PAU 300. Additional metadata for the programmable atomic instructions, such as the partition tables, can also be stored in the local memory 310.

Atomic operations manipulate the cache 325, which is generally synchronized (e.g., flushed) when a thread for an atomic operation completes. Thus, aside from initial loading from the external memory, such as the off-die memory 275 or 280, latency is reduced for most memory operations during execution of a programmable atomic operation thread.

A barrel processor, such as the processor 305, can be configured to service a number of threads in a rotating manner. The processor 305 is configured with thread scheduling circuitry 335 to iterate through scheduling queues and identify a thread that is ready for execution. The thread scheduling queues may include instructions, operations, operands, thread identifiers, or other metadata about a thread.

The thread scheduling circuitry 335 identifies a first thread that is ready for execution and injects into the compute pipeline. Thread information, such as the thread metadata, is saved in lookaside storage, for later reference. If, during the subsequent cycle there are no other threads ready for execution, the thread scheduling circuitry 335 will enter an idle state. Specifically, the thread scheduling circuitry 335 propagates a signal down the compute pipeline that the thread is an invalid thread, and then reposts or replays the previous thread using the thread information from the lookaside storage. By reusing the previous thread, the logic in the compute pipeline is held in a steady state. As a result, the components in the compute pipeline do not have to power down, store and load state, or perform other complex operations while the processor 305 idles. While the compute pipeline does use power to replay the same thread instruction, this power is less than what would be used to change gate states.

The thread scheduling circuitry 335 provides for thread replay to preserve state in a barrel processor. The thread scheduling circuitry 335 is configured to schedule a current thread to place into a pipeline for the barrel processor 305 during a clock cycle. The barrel processor 335 is used to attempt to schedule threads on each clock cycle.

The thread scheduling circuitry 335 updates or causes the update of the current thread in a temporary memory. In an example, the temporary memory comprises a register. The register may be a dedicated register for the thread scheduling circuitry 335 or the processor 305 with direct data paths from the processor 305 or thread scheduling circuitry 335 to the register. The register may be a limited size, such as four bits, 6 bits, 8 bits, etc. to store specific information. In an example, the register is used to store a thread identifier and thread metadata.

In another implementation, the register may be stored in local random-access memory of the barrel processor 305, such as local memory 310. In this implementation, the register may have a reserved address space in local memory 310 for use by the thread scheduling circuitry 335.

The thread scheduling circuitry 335 detects that no thread is available to schedule on a clock cycle subsequent to the cycle that the current thread is scheduled. For example, in an embodiment, in a processor that handles eight concurrent threads, where each thread is allotted a clock cycle, the thread scheduling circuitry 335 may detect that no threads are available to be serviced during the next seven clock cycles (seven other threads). In another example embodiment, only active threads are considered for scheduling.

Thus, when all other threads are busy, for instance, waiting for memory responses, these threads may not be ready for rescheduling. In this case, the scheduler detects that no threads are available to be serviced and reschedules the current thread to the next available cycle. The detection that all other threads are busy takes a cycle, so the current thread may be rescheduled two cycles after its first attempted execution.

In response to detecting that no thread is available on the subsequent clock cycle, the thread scheduling circuitry 335 re-schedules, replays, or repeat schedules the current thread based on the contents of the temporary memory. In an example, the thread scheduling circuitry rewrites or causes the rewriting of the thread to the temporary memory, in response to detecting that no thread is available on the subsequent clock cycle.

A signal may be asserted to indicate whether a cycle is valid or invalid. Thus, a valid cycle signal may be asserted or propagated through the compute pipeline to indicate that the current thread or instruction of a thread is a valid thread or instruction. This may be performed the first time a thread or instruction is passed through the pipeline. When a thread or instruction is replayed to effectively idle the processor 305, the signal may be changed to an invalid cycle signal to indicate to the compute pipeline that the thread is a replayed thread. In this case, the compute pipeline may hold a steady state based on the asserted invalid cycle signal.

Thus, in an embodiment, in conjunction with scheduling the current thread to place into the pipeline, the thread scheduling circuitry 335 propagates or causes the propagation of a valid cycle signal to the pipeline to cause the pipeline to alter state based on the instruction of the current thread.

When a different thread is available to schedule, then the current thread can be released from stasis in the pipeline. As such, when the thread scheduling circuitry 335 detects a thread in the thread queue that has a valid instruction for the pipeline, the thread scheduling circuitry 335 schedules the different thread. The thread scheduling circuitry 335 can store the different thread identifier in the temporary memory, which in turn will cause the pipeline to fetch an instruction for the newly identified thread and pass it into the compute pipeline. In addition, the thread scheduling circuitry 335 may propagate or cause the propagation of a valid cycle signal to the pipeline to cause the pipeline to alter state based on the instruction of the different thread.

As shown in FIG. 3, the thread scheduling circuitry 335 is integrated in the barrel processor 305, and the barrel processor 305 included in a programmable atomic unit 205. The programmable atomic unit 205 is included in a memory controller. In an example, the memory controller is a chiplet (e.g., memory controller chiplet 220 or memory controller chiplet 140) in a chiplet system 110.

Figure 4:
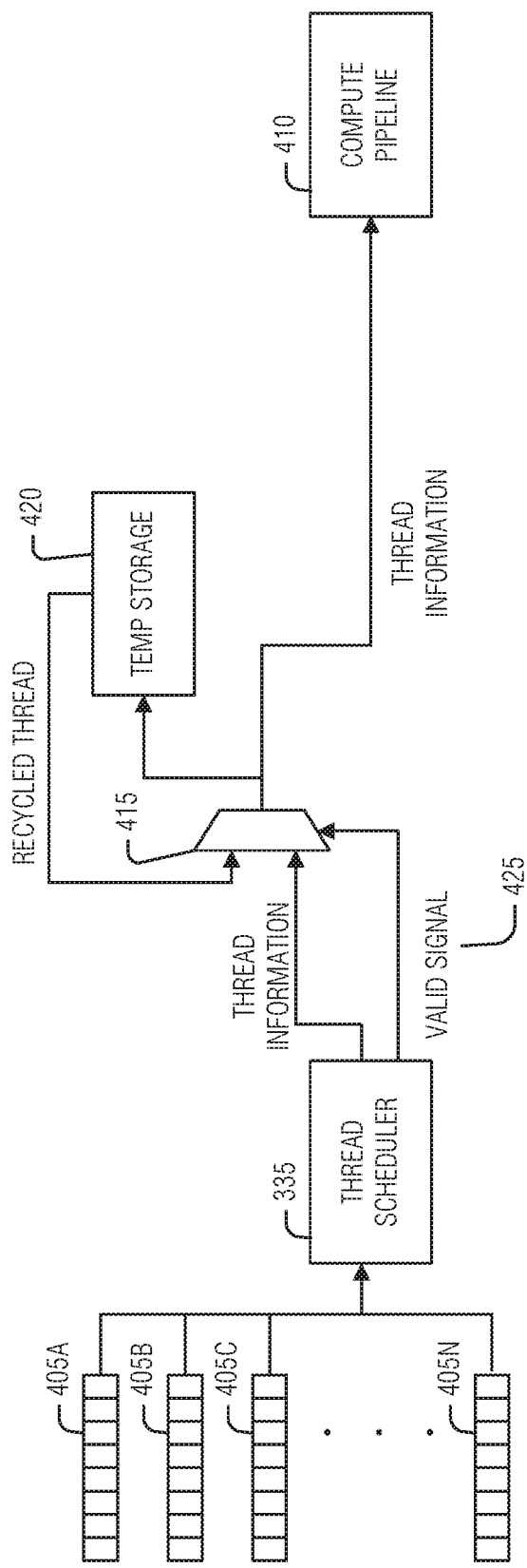
FIG. 4 is a block diagram illustrating control and data flow in a pipeline, according to an embodiment.

FIG. 4 is a block diagram illustrating control and data flow in a pipeline, according to an embodiment. A thread scheduler 335 is configured to service a number of thread scheduling queues 405A-N (collectively referred to here as 405). Thread scheduling queues 405 can include information for each thread and instructions that are queued for the corresponding thread. The queue contents may include thread identifiers, instructions, priority information, status or state flags, or the like.

When the thread scheduler 335 schedules a thread, it takes information from the selected queue. The thread's information, such as a thread identifier, is sent to the compute pipeline 410. The compute pipeline 410 includes various components that use the thread identifier to fetch an instruction to execute, perform memory operations to obtain operand data from a source address or multiple source addresses, use the instruction to obtain a result, and store the result to a destination address. The actions performed in the compute pipeline 410 are performed as an atomic operation.

In the example shown in FIG. 4, the thread information is fed into a multiplexer (MUX) 415 and stored in a temporary storage 420. Temporary storage 420 may be a register or other lookaside memory for dedicated use by the thread scheduler 335. The thread information is propagated to the compute pipeline 410.

A valid signal 425 is used as a select signal to the MUX 415, to control whether the value from the temporary storage 420 or the data from the thread scheduler 335 is used by the compute pipeline 410. When a new thread is scheduled, the valid signal 425 is set to indicate that the thread is valid and the thread information for the new thread is stored in the temporary storage 420 and passed to the compute pipeline 410. When no other thread is ready for scheduling, the valid signal 425 is set to indicate that the thread is invalid (e.g., being recycled). In this case, the same thread information is fetched from the temporary storage 420 and propagated to the compute pipeline 410. The compute pipeline 410 also receives the valid signal 425 and when the valid signal 425 is set to indicate that the thread is invalid, the compute pipeline 410 will maintain a steady state and not change state. This allows the compute pipeline 410 to stall or idle without changing its power state. In other words, no components in the compute pipeline 410 power down, and no state is stored for later reinstatement.

When a different thread is ready to be scheduled, the valid signal 425 is changed to indicate that the different thread is valid (e.g., logical one). The different thread identifier or other information is sent to the MUX 415. This thread information is stored in the temporary memory 420, replacing the previous thread identifier. The thread information is also passed to the compute pipeline 410 to be executed.

Figure 5:
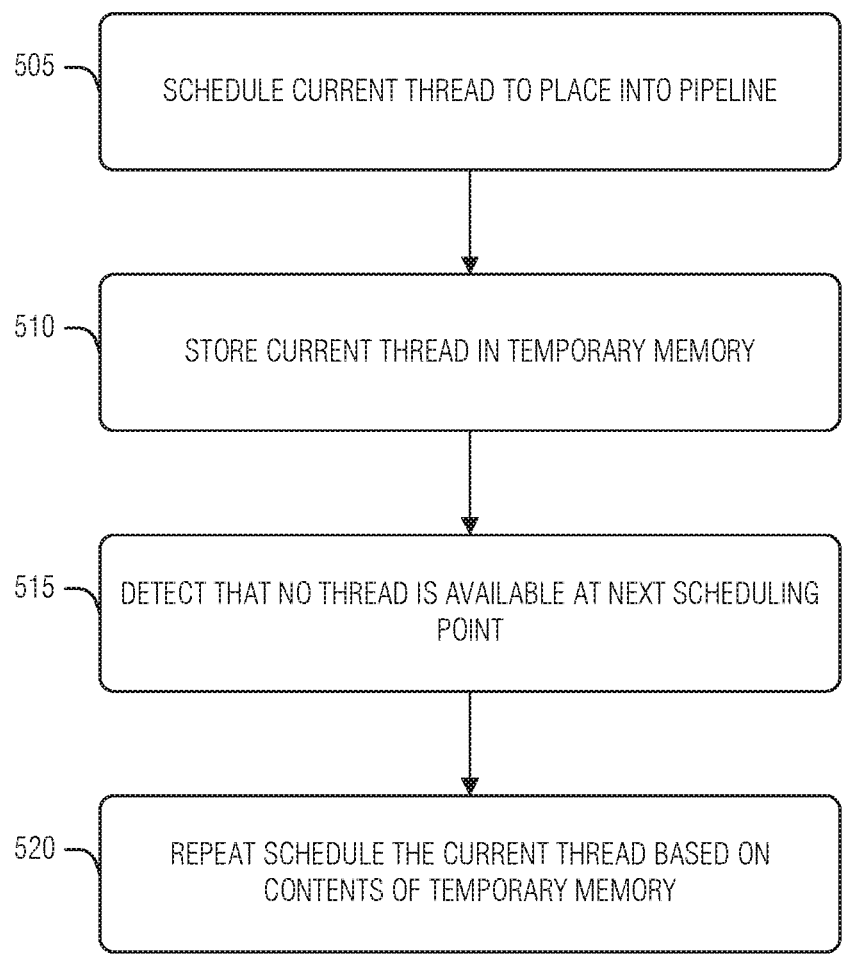
FIG. 5 is a flow chart of an example of a method for thread execution control in a barrel processor, according to an embodiment.

FIG. 5 is a flow chart of an example of a method for thread replay to preserve state in a barrel processor, according to an embodiment. Operations of the method 500 are performed by computer hardware, such as that described with respect to FIGS. 1A-1B (e.g., memory controller chiplet), FIG. 2, FIG. 3, or FIG. 6 (e.g., processing circuitry). At 505, the current thread is scheduled to be placed into a pipeline for the barrel processor (e.g., processor 305). The thread is scheduled on a clock cycle by a thread scheduling circuitry (e.g., thread scheduling circuitry 335). The barrel processor is configured to attempt to schedule threads on each clock cycle In an embodiment, in conjunction with scheduling the current thread to place into the pipeline, a valid cycle signal is propagated to the pipeline to cause the pipeline to alter state based on the instruction of the current thread. In an embodiment, propagating an invalid cycle signal to the pipeline is used to cause the pipeline to maintain state.

At 510, the current thread is stored in a temporary memory, such as temporary storage 420. In an embodiment, the temporary memory comprises a register. In a further embodiment, the register is stored in local random-access memory of the barrel processor.

At 515, the thread scheduling circuitry detects that no thread is available on a subsequent clock cycle.

At 520, in response to detecting that no thread is available on a clock cycle subsequent to the cycle that the current thread is scheduled, the thread scheduling circuitry re-schedules, replays, or repeat schedules the current thread based on the contents of the temporary memory. When no other thread is ready to be scheduled, the thread scheduling circuitry may rewrite the thread to the temporary memory, in response to detecting that no thread is available on the subsequent clock cycle.

In an embodiment, repeat scheduling the current thread comprises repeat scheduling an instruction of the current thread. The instruction associated with the thread may be an atomic operation. The atomic operation may be a built-in atomic or programmable atomic operation. The atomic operation may be stored in local memory 310 as atomic instructions 320.

The method 500 also includes operations of determining a different thread is available to schedule and then scheduling an instruction of the different thread to place into the pipeline. This different thread is stored in the temporary memory and a valid cycle signal is propagated to the pipeline to cause the pipeline to alter state based on the instruction of the different thread.

In an embodiment, the thread scheduling circuitry is integrated in the barrel processor, the barrel processor is included in a programmable atomic unit, and the programmable atomic unit is included in a memory controller. In a further embodiment, the memory controller is a chiplet in a chiplet system, such as chiplet system 110.

Figure 6:
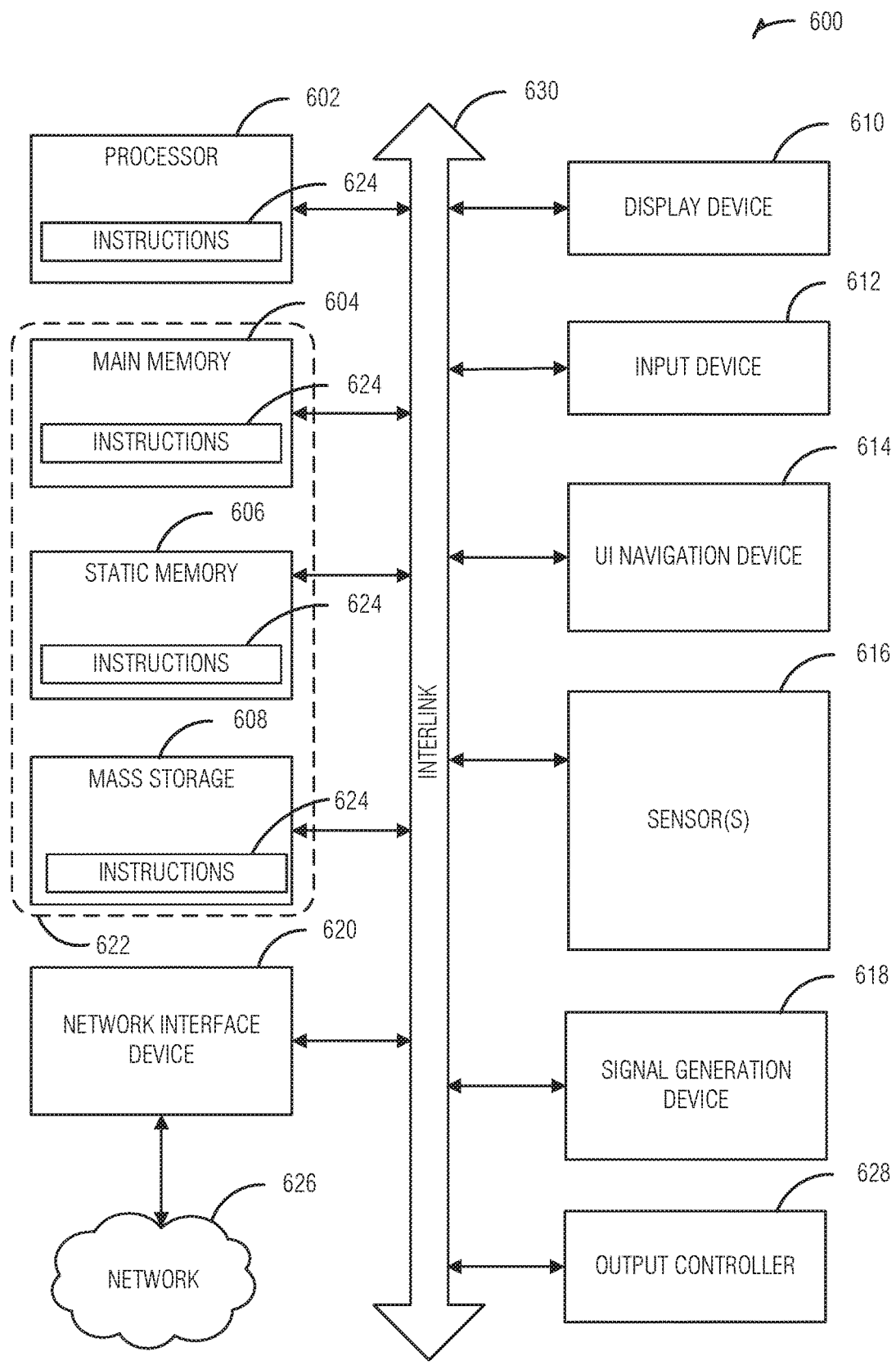
FIG. 6 is a block diagram of an example of a machine with which, in which, or by which embodiments of the present disclosure can operate.

FIG. 6 illustrates a block diagram of an example machine 600 with which, in which, or by which any one or more of the techniques (e.g., methodologies) discussed herein can be implemented. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating: thus processing circuitry in various instances, for example in various controllers as described in the specification, can include one or more processors, or cores of processors, or other instruction-executing devices. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 can operate as a standalone device or can be connected (e.g., networked)

to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 622 can be representative of the instructions 624, such as instructions 624 themselves or a format from which the instructions 624 can be derived. This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is an apparatus, comprising: a barrel processor, comprising: a temporary memory; and a thread scheduling circuitry; wherein the barrel processor is configured to perform operations through use of the thread scheduling circuitry, the operations including those to: schedule a current thread to place into a pipeline for the barrel processor on a clock cycle, the barrel processor to schedule threads on each clock cycle; store the current thread in the temporary memory; detect that no thread is available on a clock cycle subsequent to the cycle that the current thread is scheduled; and in response to detecting that no thread is available on the subsequent clock cycle, repeat scheduling the current thread based on the contents of the temporary memory.

In Example 2, the subject matter of Example 1 includes, wherein the barrel processor is to, in conjunction with scheduling the current thread to place into the pipeline, propagating a valid cycle signal to the pipeline to cause the pipeline to alter state based on the instruction of the current thread.

In Example 3, the subject matter of Examples 1-2 includes, wherein the temporary memory comprises a register.

In Example 4, the subject matter of Example 3 includes, wherein the register is stored in local random-access memory of the barrel processor.

In Example 5, the subject matter of Examples 1-4 includes, wherein repeat scheduling the current thread comprises repeat scheduling an instruction of the current thread.

In Example 6, the subject matter of Examples 1-5 includes, wherein the barrel processor is to propagate an invalid cycle signal to the pipeline to cause the pipeline to maintain state.

In Example 7, the subject matter of Examples 1-6 includes, wherein the barrel processor is to: determine a different thread is available to schedule; schedule an instruction of the different thread to place into the pipeline; store the different thread in the temporary memory; and propagate a valid cycle signal to the pipeline to cause the pipeline to alter state based on the instruction of the different thread.

In Example 8, the subject matter of Examples 1-7 includes, wherein the thread scheduling circuitry is to rewrite the thread to the temporary memory, in response to detecting that no thread is available on the subsequent clock cycle.

In Example 9, the subject matter of Examples 1-8 includes, wherein the thread scheduling circuitry is integrated in the barrel processor, the barrel processor included in a programmable atomic unit, and the programmable atomic unit is included in a memory controller.

In Example 10, the subject matter of Example 9 includes, wherein the memory controller is a chiplet in a chiplet system.

Example 11 is a method, comprising: scheduling, at a barrel processing including thread scheduling circuitry, a current thread to place into a pipeline for a barrel processor on a clock cycle, the barrel processor to schedule threads on each clock cycle: storing the current thread in a temporary memory; detecting that no thread is available on a clock cycle subsequent to the cycle that the current thread is scheduled; and in response to detecting that no thread is available on the subsequent clock cycle, repeat scheduling the current thread based on the contents of the temporary memory.

In Example 12, the subject matter of Example 11 includes, in conjunction with scheduling the current thread to place into the pipeline, propagating a valid cycle signal to the pipeline to cause the pipeline to alter state based on the instruction of the current thread.

In Example 13, the subject matter of Examples 11-12 includes, wherein the temporary memory comprises a register.

In Example 14, the subject matter of Example 13 includes, wherein the register is stored in local random-access memory of the barrel processor.

In Example 15, the subject matter of Examples 11-14 includes, wherein repeat scheduling the current thread comprises repeat scheduling an instruction of the current thread.

In Example 16, the subject matter of Examples 11-15 includes, propagating an invalid cycle signal to the pipeline to cause the pipeline to maintain state.

In Example 17, the subject matter of Examples 11-16 includes, determining a different thread is available to schedule; scheduling an instruction of the different thread to place into the pipeline; storing the different thread in the temporary memory; and propagating a valid cycle signal to the pipeline to cause the pipeline to alter state based on the instruction of the different thread.

In Example 18, the subject matter of Examples 11-17 includes, rewriting the thread to the temporary memory, in response to detecting that no thread is available on the subsequent clock cycle.

In Example 19, the subject matter of Examples 11-18 includes, wherein the thread scheduling circuitry is integrated in the barrel processor, the barrel processor included in a programmable atomic unit, and the programmable atomic unit is included in a memory controller.

In Example 20, the subject matter of Example 19 includes, wherein the memory controller is a chiplet in a chiplet system.

Example 21 is a machine-readable medium including instructions, which when executed by a barrel processor having thread scheduling circuitry, cause the barrel processor to: schedule a current thread to place into a pipeline for the barrel processor on a clock cycle, the barrel processor to schedule threads on each clock cycle; store the current thread in a temporary memory; detect that no thread is available on a clock cycle subsequent to the cycle that the current thread is scheduled; and in response to detecting that no thread is available on the subsequent clock cycle, repeat scheduling the current thread based on the contents of the temporary memory.

In Example 22, the subject matter of Example 21 includes, instructions to, in conjunction with scheduling the current thread to place into the pipeline, propagating a valid cycle signal to the pipeline to cause the pipeline to alter state based on the instruction of the current thread.

In Example 23, the subject matter of Examples 21-22 includes, wherein the temporary memory comprises a register.

In Example 24, the subject matter of Example 23 includes, wherein the register is stored in local random-access memory of the barrel processor.

In Example 25, the subject matter of Examples 21-24 includes, wherein repeat scheduling the current thread comprises repeat scheduling an instruction of the current thread.

In Example 26, the subject matter of Examples 21-25 includes, instructions to propagate an invalid cycle signal to the pipeline to cause the pipeline to maintain state.

In Example 27, the subject matter of Examples 21-26 includes, instructions to: determine a different thread is available to schedule; schedule an instruction of the different thread to place into the pipeline; store the different thread in the temporary memory; and propagate a valid cycle signal to the pipeline to cause the pipeline to alter state based on the instruction of the different thread.

In Example 28, the subject matter of Examples 21-27 includes, instructions to rewrite the thread to the temporary memory, in response to detecting that no thread is available on the subsequent clock cycle.

In Example 29, the subject matter of Examples 21-28 includes, wherein the thread scheduling circuitry is integrated in the barrel processor, the barrel processor included in a programmable atomic unit, and the programmable atomic unit is included in a memory controller.

In Example 30, the subject matter of Example 29 includes, wherein the memory controller is a chiplet in a chiplet system.

Example 31 is an apparatus for thread replay to preserve state in a barrel processor, the apparatus comprising: means for scheduling, at a barrel processor including thread scheduling circuitry, a current thread to place into a pipeline for the barrel processor on a clock cycle, the barrel processor to schedule threads on each clock cycle; means for storing the current thread in a temporary memory; means for detecting that no thread is available on a clock cycle subsequent to the cycle that the current thread is scheduled; and means for, in response to detecting that no thread is available on the subsequent clock cycle, repeat scheduling the current thread based on the contents of the temporary memory.

In Example 32, the subject matter of Example 31 includes, means for, in conjunction with scheduling the current thread to place into the pipeline, propagating a valid cycle signal to the pipeline to cause the pipeline to alter state based on the instruction of the current thread.

In Example 33, the subject matter of Examples 31-32 includes, wherein the temporary memory comprises a register.

In Example 34, the subject matter of Example 33 includes, wherein the register is stored in local random-access memory of the barrel processor.

In Example 35, the subject matter of Examples 31-34 includes, wherein repeat scheduling the current thread comprises repeat scheduling an instruction of the current thread.

In Example 36, the subject matter of Examples 31-35 includes, means for propagating an invalid cycle signal to the pipeline to cause the pipeline to maintain state.

In Example 37, the subject matter of Examples 31-36 includes, means for determining a different thread is available to schedule; means for scheduling an instruction of the different thread to place into the pipeline; means for storing the different thread in the temporary memory; and means for propagating a valid cycle signal to the pipeline to cause the pipeline to alter state based on the instruction of the different thread.

In Example 38, the subject matter of Examples 31-37 includes, means for rewriting the thread to the temporary memory, in response to detecting that no thread is available on the subsequent clock cycle.

In Example 39, the subject matter of Examples 31-38 includes, wherein the thread scheduling circuitry is integrated in the barrel processor, the barrel processor included in a programmable atomic unit, and the programmable atomic unit is included in a memory controller.

In Example 40, the subject matter of Example 39 includes, wherein the memory controller is a chiplet in a chiplet system.

Example 41 is an apparatus, comprising: a memory controller chiplet in a chiplet system, the memory controller chiplet comprising: a programmable atomic unit, the programmable atomic unit comprising: a barrel processor, the barrel processor comprising: a temporary memory; and thread scheduling circuitry; wherein the barrel processor is configured to perform operations through use of the thread scheduling circuitry, the operations including: scheduling a current thread to place into a pipeline for a barrel processor on a clock cycle, the barrel processor to schedule threads on each clock cycle; storing the current thread in the temporary memory; detecting that no thread is available on a clock cycle subsequent to the cycle that the current thread is scheduled; and in response to detecting that no thread is available on the subsequent clock cycle, repeat scheduling the current thread based on the contents of the temporary memory.

In Example 42, the subject matter of Example 41 includes, wherein the barrel processor is configured to perform operations through use of the thread scheduling circuitry, including in conjunction with scheduling the current thread to place into the pipeline, propagating a valid cycle signal to the pipeline to cause the pipeline to alter state based on the instruction of the current thread.

In Example 43, the subject matter of Examples 41-42 includes, wherein the temporary memory comprises a register.

In Example 44, the subject matter of Example 43 includes, wherein the register is stored in local random-access memory of the barrel processor.

In Example 45, the subject matter of Examples 41-44 includes, wherein repeat scheduling the current thread comprises repeat scheduling an instruction of the current thread.

In Example 46, the subject matter of Examples 41-45 includes, wherein the barrel processor is configured to perform operations through use of the thread scheduling circuitry, including propagating an invalid cycle signal to the pipeline to cause the pipeline to maintain state.

In Example 47, the subject matter of Examples 41-46 includes, wherein the barrel processor is configured to perform operations through use of the thread scheduling circuitry, including: determining a different thread is available to schedule; scheduling an instruction of the different thread to place into the pipeline; storing the different thread in the temporary memory; and propagating a valid cycle signal to the pipeline to cause the pipeline to alter state based on the instruction of the different thread.

In Example 48, the subject matter of Examples 41-47 includes, wherein the barrel processor is configured to perform operations through use of the thread scheduling circuitry, including rewriting the thread to the temporary memory, in response to detecting that no thread is available on the subsequent clock cycle.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus, comprising:
  a barrel processor, comprising:
    a temporary memory; and
    a thread scheduling circuitry;
    wherein the barrel processor is configured to perform operations through use of the thread scheduling circuitry, the operations including those to:
      schedule a current thread to place into a pipeline for the barrel processor on a clock cycle, the barrel processor to schedule threads on each clock cycle;
      store the current thread in the temporary memory while the current thread is being executed in the pipeline;
      detect that no thread is available to schedule from a thread scheduling queue on a clock cycle subsequent to the clock cycle that the current thread is scheduled; and
      in response to detecting that no thread is available on the subsequent clock cycle, repeat scheduling the current thread based on contents of the temporary memory instead of the thread scheduling queue.

2. The apparatus of claim 1, wherein the barrel processor is to, in conjunction with scheduling the current thread to place into the pipeline, propagating a valid cycle signal to the pipeline to cause the pipeline to alter state based on the instruction of the current thread.

3. The apparatus of claim 1, wherein the temporary memory comprises a register.

4. The apparatus of claim 3, wherein the register is stored in local random-access memory of the barrel processor.

5. The apparatus of claim 1, wherein repeat scheduling the current thread comprises repeat scheduling an instruction of the current thread.

6. The apparatus of claim 1, wherein the barrel processor is to propagate an invalid cycle signal to the pipeline to cause the pipeline to maintain state.

7. The apparatus of claim 1, wherein the barrel processor is to:
  determine a different thread is available to schedule;
  schedule an instruction of the different thread to place into the pipeline;
  store the different thread in the temporary memory; and
  propagate a valid cycle signal to the pipeline to cause the pipeline to alter state based on the instruction of the different thread.

8. The apparatus of claim 1, wherein the thread scheduling circuitry is to rewrite the thread to the temporary memory, in response to detecting that no thread is available on the subsequent clock cycle.

9. The apparatus of claim 1, wherein the thread scheduling circuitry is integrated in the barrel processor, the barrel processor included in a programmable atomic unit, and the programmable atomic unit is included in a memory controller.

10. The apparatus of claim 9, wherein the memory controller is a chiplet in a chiplet system.

11. A method, comprising:
  scheduling, at a barrel processing including thread scheduling circuitry, a current thread to place into a pipeline for a barrel processor on a clock cycle, the barrel processor to schedule threads on each clock cycle;
  storing the current thread in a temporary memory while the current thread is being executed in the pipeline;
  detecting that no thread is available to schedule from a thread scheduling queue on a clock cycle subsequent to the clock cycle that the current thread is scheduled; and
  in response to detecting that no thread is available on the subsequent clock cycle, repeat scheduling the current thread based on contents of the temporary memory instead of the thread scheduling queue.

12. The method of claim 11, comprising, in conjunction with scheduling the current thread to place into the pipeline, propagating a valid cycle signal to the pipeline to cause the pipeline to alter state based on the instruction of the current thread.

13. The method of claim 11, wherein the temporary memory comprises a register.

14. The method of claim 13, wherein the register is stored in local random-access memory of the barrel processor.

15. The method of claim 11, wherein repeat scheduling the current thread comprises repeat scheduling an instruction of the current thread.

16. The method of claim 11, comprising propagating an invalid cycle signal to the pipeline to cause the pipeline to maintain state.

17. The method of claim 11, comprising:
determining a different thread is available to schedule;
scheduling an instruction of the different thread to place into the pipeline;
storing the different thread in the temporary memory; and
propagating a valid cycle signal to the pipeline to cause the pipeline to alter state based on the instruction of the different thread.

18. The method of claim 11, comprising rewriting the thread to the temporary memory, in response to detecting that no thread is available on the subsequent clock cycle.

19. The method of claim 11, wherein the thread scheduling circuitry is integrated in the barrel processor, the barrel processor included in a programmable atomic unit, and the programmable atomic unit is included in a memory controller.

20. The method of claim 19, wherein the memory controller is a chiplet in a chiplet system.

21. An apparatus, comprising:
a memory controller chiplet in a chiplet system, the memory controller chiplet comprising:
a programmable atomic unit, the programmable atomic unit comprising:
a barrel processor, the barrel processor comprising:
a temporary memory; and
thread scheduling circuitry;
wherein the barrel processor is configured to perform operations through use of the thread scheduling circuitry, the operations including:
scheduling a current thread to place into a pipeline for a barrel processor on a clock cycle, the barrel processor to schedule threads on each clock cycle;
storing the current thread in the temporary memory while the current thread is being executed in the pipeline;
detecting that no thread is available to schedule from a thread scheduling queue on a clock cycle subsequent to the clock cycle that the current thread is scheduled; and
in response to detecting that no thread is available on the subsequent clock cycle, repeat scheduling the current thread based on contents of the temporary memory instead of the thread scheduling queue.

22. The apparatus of claim 21, wherein the barrel processor is configured to perform operations through use of the thread scheduling circuitry, including in conjunction with scheduling the current thread to place into the pipeline, propagating a valid cycle signal to the pipeline to cause the pipeline to alter state based on the instruction of the current thread.

23. The apparatus of claim 21, wherein the temporary memory comprises a register.

24. The apparatus of claim 23, wherein the register is stored in local random-access memory of the barrel processor.

25. The apparatus of claim 21, wherein repeat scheduling the current thread comprises repeat scheduling an instruction of the current thread.

* * * * *